ALUMINUM ELECTRODE ELECTROLYTIC CAPACITOR CONSTRUCTION

Original Filed Dec. 3, 1969

INVENTORS:
DAVID A. VERMILYEA
DONALD R. OCHAR
WILLEM VEDDER
by Leo J. Ma Lossi
THEIR ATTORNEY United States Patent Office Re. 28,015
Reissued May 21, 1974

28,015
ALUMINUM ELECTRODE ELECTROLYTIC CAPACITOR CONSTRUCTION

David A. Vermilyea, Schenectady, N.Y., Donald R. Ochar, Columbia, S.C., and Willem Vedder, Albany, N.Y., by General Electric Co., New York, N.Y.

Original No. 3,622,843, dated Nov. 23, 1971, Ser. No. 881,853, Dec. 3, 1969. Application for reissue Sept. 13, 1972, Ser. No. 288,508
Int. Cl. H01g *13/00*
U.S. Cl. 29—570 6 Claims

Matter enclosed in heavy brackets [ ] appears in the original patent but forms no part of this reissue specification; matter printed in italics indicates the additions made by reissue.

ABSTRACT OF THE DISCLOSURE

Both the passivation of aluminum foil particularly for use as electrodes in wet electrolytic capacitors and the inhibition of the aluminum-water reaction within the completed capacitor are described. Pretreatment of etched aluminum foil includes the combined steps of immersion in a boiling aqueous solution containing $CrO_3$ and $H_3PO_4$ followed by a 3-minute immersion in a boiling solution of controlled pH containing $H_2PO_4^-$, $SiO_3^=$ and $CrO_3$. Inhibition of aluminum in a wet electrolytic capacitor is afforded by the addition of a concentration of at least one of the following inhibiting ions to the liquid electrolyte: phosphate, phosphite, periodate, arsenate, tungstate, silicate *vanadate* [vandadate], tellurate, tellurite, antimonate, arsenite, selenate, sulfite and germanate.

BACKGROUND OF THE INVENTION

The capacity of an electrolytic capacitor is determined primarily by the area of the electrode (usually the anode) surface and the thickness of the dielectric film covering this surface. The typical wet electrolytic capacitor employs an etched surface electrode structure and a number of methods have been developed to produce the desired roughening of the electrode surface. The most effective of these methods is the electrolytic etching of the electrode foil, while the foil is immersed in an etching solution e.g. sodium chloride (followed in some cases, e.g. for high-voltage applications by etching in nitric acid). In the process of electrolytic etching the foil is made the positive electrode with respect to a second electrode immersed in the same etching solution. The resulting attack upon the aluminum develops pores extending into the foil, these pores ranging from about 1–5 microns in lateral dimension and penetrating to a depth of from about 100–500 microns.

It has been found that aluminum foil etched for usage as electrodes in electrolytic capacitors loses capacitance during storage. This loss in capacitance is believed to be the result of blockage of some or all of the small pores by the formation therein of aluminum hydroxide, a corrosion product of the aluminum/water reaction. Water for this destructive reaction is most often present in the atmosphere of the storage facilities and in event of temperature cycling liquid water may condense within these small pores. Aluminum oxidation in liquid water produces a layer of amorphous oxide, which dissolves and reprecipitates as a porous layer of hydroxide of (A100H), which may grow to a thickness of several microns depending upon the temperature. Development of this corrosion product within the small pores, therefore, decreases the available electrode area. Prevention of the aluminum hydroxide formation would, therefore, be beneficial to minimizing reduction in capacitance during storage.

After etching, the electrodes are cleaned, usually by rinsing in water, to remove all traces of any contaminating or foreign materials, which might either affect formation of the requisite dielectric film or affect the performance of the finished capacitor. After cleaning, the aluminum foil to be used as the anode is anodized to form an anodic oxide (predominately amorphous $Al_2O_3$) layer thereon using either a basic or an acidic anodizing electrolyte. Numerous electrolytes for the formation of anodic films are listed on page 55 of the test book "Electrolytic Capacitors" by Paul McKnight Deeley (Recorder Press 1938). The most commonly used anodizing electrolytes are boric acid and inorganic phosphates.

The anodic oxide layer formed substantially uniformly covers all of the etched surface (both sides) of the aluminum foil even extending into and covering the inside surfaces of the small pores.

When the active dielectric film of aluminum oxide has been formed, a typical electrode assembly (anode/paper spacer/cathode/paper spacer) is prepared. This assembly is rolled into a cylindrical configuration and impregnated with (as by immersion) a fill electrolyte for "aging." During the aging process a potential is applied to the electrode assembly equal to or slightly in excess of the rated operating voltage for the completed capacitor for a predetermined period of time. The aging, or reforming, potential tends to repair any breakage or cracking, which may have occurred in the anodic film during the handling and assembly.

When the aging has been completed, the electrode assembly is inserted into an aluminum can and the can is capped and sealed.

Fill electrolytes (as distinguished from anodizing electrolytes) are either nonaqueous (organic solvent) or have a low-water content. Ethylene glycol is frequently used, because of its solvent characteristics and low-freezing point.

During sustained periods, when the completed capacitor is stored or is standing on open circuit, the anodic oxide layer is constantly subject to attack by water deliberately or spuriously present in the fill electrolyte. This degradation according to the aluminum/water reaction can reduce the dielectric strength of the capacitor to such a level that the imposition of a normal electrical load may cause failure of the capacitor.

It is to this problem of open circuit dielectric degradation as well as to the problem of degradation of etched aluminum foil during storage that the instant invention is directed for the purpose of optimizing electrolytic capacitor construction.

In describing this invention the terms "passivation" and "inhibition" are employed. These terms are defined as follows:

Passivation is the rendering of a metallic or metallic oxide surface relatively immune to corrosive attack in a normally hostile environment.

Inhibition is the rendering innocuous of a normally hostile environment by the addition of substances to the environment.

SUMMARY OF THE INVENTION

The instant invention introduces into the sequence of steps in preparing a wet electrolytic capacitor (a) a modified pretreatment of the etched aluminum foil to passivate the etched surface in order to delay the initiation of hydroxide formation from reaction of the aluminum with water and/or (b) the addition of one or more substances of a specific class, which provide inhibitor ions, to the fill electrolyte such that the completed electrolytic capacitor is afforded protection against dissolution of the dielectric oxide during periods of electrical inactivity.

BRIEF DESCRIPTION OF THE DRAWING

The exact nature of this invention as well as objects and advantages thereof will be readily apparent from consideration of the following specification relating to the annexed drawing in which.

DESCRIPTION OF THE PREFERRED EMBODIMENT

Figure 1:
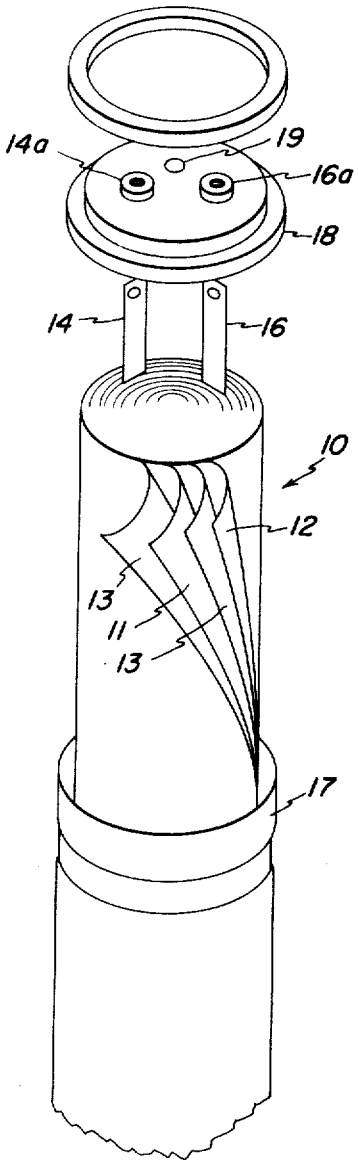
FIG. 1 is an exploded view of an example of an electrolytic capacitor to which the instant invention applies and FIG. 2 is a diagrammatic representation of the process of preparation of electrolytic capacitors according to the invention.

As is shown in FIG. 1, capacitor 10 comprises cooperating electrodes 11, 12 in the form of thin aluminum foils. These electrodes have a thin film of aluminum oxide thereon. Between electrodes 11 and 12 as they are arranged in the electrode assembly are disposed spacers 13 consisting of sheets of absorbent material. Spacers 13 are, or become, impregnated with electrolytic composition. Terminal tabs 14, 16 are provided for establishing electrical contact to the electrodes. After preparation, the electrode assembly is placed in aluminum can 17, which is sealed with cap 18 provided with external terminals 14a, 16a (connected to the tabs 14, 16, respectively) and vent plug hole 19 for the release of excess internal pressure.

Figure 2:
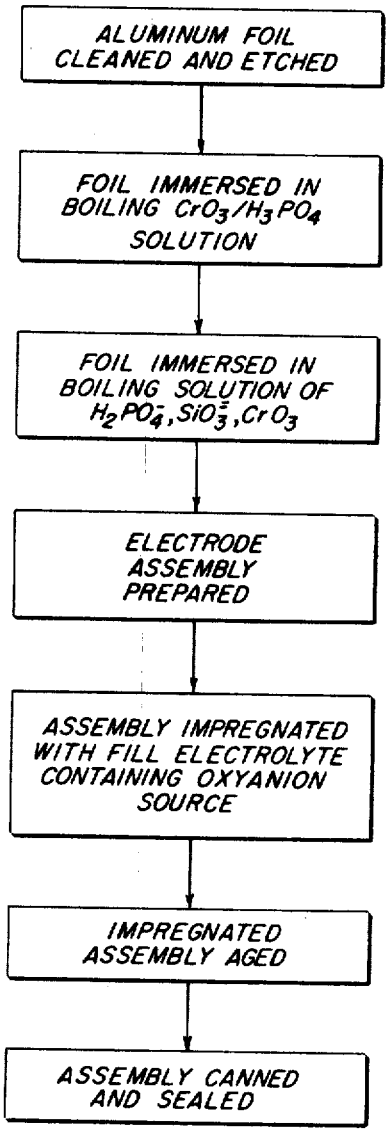

As is described in FIG. 2, after etching and cleaning and prior to storage or anodizing, the aluminum foil is subjected to a sequence of two steps, which produces substantial passivation of the aluminum foil.

In the first step of the sequence the etched aluminum foil is immersed in a boiling aqueous solution containing $CrO_3$ and $H_3PO_4$. This immersion reduces the thickness of the thin $Al_2O_3$ layer (normally present on the surface of aluminum) after which a complex region develops at the surface of the $Al_2O_3$ layer as this layer reaches an equilibrium condition, when the rate of layer buildup equals the rate of layer dissolution. The complex region at the surface of the $Al_2O_3$ layer contains $CrO_3$ and $PO_4^{\equiv}$, but is incapable of rendering the system highly passive. It is essential that this stripping operation be accomplished first and be followed by the second step.

Once equilibrium has been reached the second step may be conducted. In this step the stripped etched aluminum foil is immersed in a boiling aqueous solution containing $CrO_3$. $H_2PO_4^-$ and $SiO_3^{\equiv}$ (with pH adjusted to a value ranging from 4 to 6) which exposure changes the complex layer at least by including $SiO_3^=$ as a component thereof.

In a typical passivation sequence a conventional stripping solution (20 grams $CrO_3$ and 35 milliliters of concentrated $H_3PO_4$ per liter of water) may be used with the immersion lasting from 1 to 5 minutes followed by a 3 minute immersion in an aqueous solution of adjusted pH containing from about $10^{-4}$ to $10^{-2}$ moles per liter of each of $NaH_2PO_4$, $Na_2SiO_3$ and $CrO_3$.

Use of this pretreatment sequence has shown that initiation of hydroxide formation according to the aluminum/water reaction is delayed by at least a factor of $10^3$ as compared to untreated foil and by at least a factor of 10 compared to aluminum foil subjected to the first, but not the second, step of this sequence.

The above-described procedure for passivating aluminum foil may be applied to either etched or plain foil. however, the prime object has been to prevent destruction during storage of the high-surface area developed by the etching process.

The passivated aluminum foil may be stored at considerably reduced risk until ready for the anodizing step preparatory to constructing the electrolytic capacitor.

In addition, when the internal construction of the electrolytic capacitor 10 has been prepared, rolled, aged and inserted into the aluminum can 17, the corrosion process (which will otherwise occur within the sealed capacitor between the exposed aluminum surfaces and liquid water in the electrolyte and between the anodic oxide layer and liquid water) may be inhibited by introducing certain inorganic substances into the capacitor can dissolved in the fill electrolyte.

Thus, it has been determined that inhibition will be strong when (a) in the oxyanion of the inhibitor the centrally located, positively charged component (for example, phosphorous in the $H_2PO_4^-$ ion) has a radius between 0.24 and 0.5 times the radius of oxygen and when (b) the inhibiting oxyanion has a proton level of −0.4 to −0.7 ev. relative to that of a proton in $H_3O^+$. In essence, the structure and proton level of the inhibitor ion should be close to the structure and proton level of aluminum oxide. The substances which have the required structure and proton level are tellurate, tellurite, tungstate, antimonate, vanadate, *arsenate, arsenite,* [aresenate, aresenite] selenate, sulfite, periodate, phosphate, phosphite, germanate and silicate ions. All of these substances are effective inhibitors, the strongest being phosphate, phosphite, periodate, arsenate, tungstate, silicate and vanadate in the order given. The pH of maximum effectiveness is about 5±1. The oxyanion concentration dissolved in the fill electrolyte should be in the range of from about $10^{-5}$ to 10 weight percent of the electrolyte solution with the preferred range being from about 0.1 to about 1.0 weight percent.

Thus, by adding to the fill electrolyte soluble salts, which are compatible with the fill electrolyte and which provide concentrations of ions of one or more of the above materials (e.g. the sodium, potassium, calcium, ammonium salts thereof) so that the concentration of requisite ions remains within the sealed electrolytic capacitor, initiation of the corrosion process is delayed by at least a factor of 100 compared to electrolytic capacitors, which do not contain the aforementioned inhibiting ions.

Examples of fill electrolytes are as follows (percentages are by weight).

A. Organic solvent electrolyte (with organic and inorganic salts)

| | |
|---|---|
| Ethylene glycol | 49.8 |
| Boric acid | 10.0 |
| Pyrogallol | 10.0 |
| Methylamine | 30.0 |
| Sodium phosphate | 0.2 |
| | 100.0 |

B. Organic solvent electrolyte (with organic salts)

| | |
|---|---|
| Dimethylformamide | 98.7 |
| Oxalic acid | 1.0 |
| Ammonium oxalate | 0.1 |
| Ammonium phosphate | 0.2 |
| | 100.0 |

C. Organic solvent electrolyte (with inorganic salts)

| | |
|---|---|
| Ethylene glycol | 89.8 |
| Ammonium biborate | 10.0 |
| Ammonium phosphite | 0.2 |
| | 100.0 |

D. Aqueous electrolyte (organic salt+water)

| | |
|---|---|
| Ammonium tartrate | 10.0 |
| Water | 89.8 |
| Ammonium periodate | 0.2 |
| | 100.0 |

What we claim as new and desire to secure by Letters Patent of the United States:

1. In the preparation of a wet electrolytic capacitor wherein the following steps are performed: etching aluminum foil; cleaning said etched foil; anodizing said etched, cleaned foil; preparing an electrode assembly wherein anode and cathode layers are separated by spacers, said anode layer being made of said anodized foil; impregnating said electrode assembly with a fill electrolyte; "aging" said electrode assembly by the application of electrical potential thereto; introducing said "aged" electrode assembly into a cam; and capping and sealing said can, the improvement in said series of steps comprising:

a. immersing the cleaned etched foil in a first boiling aqueous solution containing $CrO_3$ and $H_3PO_4$,
b. immersing said foil so modified in a second boiling aqueous solution containing from about $10^{-4}$ to $10^{-2}$ moles per liter of each of $H_2PO_4^-$, $SiO_3^=$ and $CrO_3$ and
c. dissolving in the fill electrolyte a water-soluble source of inhibiting oxyanions, said oxyanions being present in a concentration in the range of from about $10^{-6}$ to about 10 percent by weight of the electrolyte solution and being selected from the group consisting of tellurate, tellurite, tungstate, antimonate, vanadate, arsenate, arsenite, selenate, sulfite, periodate, *phosphate, phosphite, germanate and silicate ions.*

2. The improvement of claim 1 wherein the second boiling solution contains $NaH_2PO_4$, $Na_2SiO_3$ and $CrO_3$.

3. The improvement of claim 1 wherein the pH of the boiling solution is adjusted in the range of from 4 to 6.

[4. In the preparation of a wet electrolytic capacitor wherein the following steps are performed: etching aluminum foil; cleaning said etched foil; anodizing said etched, cleaned foil; preparing an electrode assembly wherein anode and cathode layers are separated by spacers, said anode layer being made of said anodized foil; impregnating said electrode assembly with a fill electrolyte; "aging" said electrode assembly by the application of electrical potential thereto; introducing said "aged" electrode assembly into a can; and capping and sealing said can, the improvement in said series of steps comprising:

a. dissolving in the fill electrolyte a water-soluble source of inhibiting oxyanions, said oxyanions being present in a concentration in the range of from about $10^{-6}$ to about 10 percent by weight of the electrolyte solution and being selected from the group consisting of tellurate, tellurite, tungstate, antimonate, arsenate, arsenite, selenate, sulfite, periodate, and germanate ions.]

[5. The improvement of claim 4 wherein the pH of the fill electrolyte is in the range of from 4 to 6.]

[6. The improvement of claim 4 wherein the concentration of dissolved oxyanions is in the range of from about 0.1 to about 1.0 percent by weight of the electrolyte solution.]

7. In the preparation of a wet electrolytic capacitor wherein the following steps are performed: etching aluminum foil; cleaning said etched foil; anodizing said etched, cleaned foil; preparing an electrode assembly wherein anode and cathode layers are separated by spacers, said anode layer being made of said anodized foil; impregnating said electrode assembly with a fill electrolyte; "aging" said electrode assembly by the application of electrical potential thereto; introducing said "aged" electrode assembly into a can; and capping and sealing said can, the improvement in said series of steps comprising:

a. immersing the cleaned etched foil in a first boiling aqueous solution containing $CrO_3$ and $H_3PO_4$ and b. immersing the foil as modified by step (a) in a second boiling aqueous solution containing from about $10^{-4}$ to $10^{-2}$ moles per liter of each of $H_2PO_4^-$, $SiO_3^=$ and $CrO_3$ whereby etched aluminum foil may be stored without substantial deterioration prior to the anodizing step.

8. The improvement of claim 7 wherein the second boiling solution contains $NaH_2PO_4$, $Na_2SiO_3$ and $CrO_3$.

9. A method for the passivation of an aluminum surface comprising the steps of:

a. immersing the aluminum surface in a first boiling aqueous solution containing $CrO_3$ and $H_3PO_4$ and
b. immersing the aluminum surface as modified by step (a) in a second boiling aqueous solution containing from about $10^{-4}$ to $10^{-2}$ moles per liter of each of $H_2PO_4^-$, [and] $SiO_3^=$ and $CrO_3$.

[10. In a wet electrolytic capacitor wherein a housing contains an anodized aluminum anode and a liquid electrolyte and means are attached to said housing for the forming of an external electrical connection thereto, said housing being sealed to prevent leakage of the electrolyte therefrom, the improvement in said combination wherein a water-soluble source of inhibitive ions is disposed in said housing with said electrolyte, said inhibitive ions being present in said electrolyte in a concentration in the range of from about $10^{-6}$ to about 10 percent by weight of electrolyte solution and being selected from the group consisting of tellurate, tellurite, tungstate, antimonate, arsenate, arsenite, selenate, sulfite, periodate, and germanate ions.]

11. The improvement of claim 6 wherein the pH of the fill electrolyte is in the range of from 4 to 6.]

[12. The improvement of claim 10 wherein the concentration of dissolved ions is in the range of from about 0.1 to about 1.0 percent by weight of the electrolyte solution.]

References Cited

The following references, cited by the Examiner, are of record in the patented file of this patent or the original patent.

UNITED STATES PATENTS

| | | | |
|---|---|---|---|
| 3,329,873 | 7/1967 | Hagihara et al. | 317—230 |
| 2,890,394 | 6/1959 | Stephenson et al. | 317—230 |
| 2,875,384 | 2/1959 | Wallmark | 317—234 |
| 3,345,544 | 10/1967 | Metcalfe | 317—230 |
| 3,502,947 | 3/1970 | Hand | 317—230 |
| 2,965,816 | 12/1960 | Ross | 317—230 |
| 3,547,423 | 12/1970 | Jenny et al. | 317—230 |
| 2,019,154 | 4/1936 | Emmens et al. | 317—230 |
| 2,757,140 | 7/1956 | Bush | 317—230 X |
| 2,934,682 | 4/1960 | Schwartz et al. | 317—230 |
| 2,994,809 | 8/1961 | Jenny et al. | 317—230 |
| 3,003,089 | 10/1961 | Bernard et al. | 317—230 |
| 3,138,746 | 6/1964 | Burger et al. | 317—230 |
| 2,934,681 | 4/1960 | Ross | 317—230 |

OTHER REFERENCES

Periodic Table of the Elements, E. H. Sargent & Co., Chicago, 1964.

RUDOLPH V. ROLINEC, Primary Examiner

W. D. LARKINS, Assistant Examiner

U.S. Cl. X.R.

148—6.16, 6.27; 317—230